US011371570B2

(12) United States Patent
Rogg

(10) Patent No.: US 11,371,570 B2
(45) Date of Patent: Jun. 28, 2022

(54) DRIVE TRAIN OF A WIND TURBINE COMPRISING A TORQUE LIMITER, WIND TURBINE

(71) Applicant: Adwen GmbH, Bremerhaven (DE)

(72) Inventor: Andreas Rogg, Hamburg (DE)

(73) Assignee: ADWEN GMBH, Bremerhaven (DE)

( * ) Notice: Subject to any disclaimer, the term of this patent is extended or adjusted under 35 U.S.C. 154(b) by 0 days.

(21) Appl. No.: 17/030,442

(22) Filed: Sep. 24, 2020

(65) Prior Publication Data

US 2021/0095725 A1 Apr. 1, 2021

(30) Foreign Application Priority Data

Sep. 30, 2019 (EP) ..................................... 19200560

(51) Int. Cl.
| | |
|---|---|
| *F16D 43/21* | (2006.01) |
| *F03D 9/25* | (2016.01) |
| *F16D 7/02* | (2006.01) |
| *F03D 15/00* | (2016.01) |

(52) U.S. Cl.
CPC .............. *F16D 43/215* (2013.01); *F03D 9/25* (2016.05); *F03D 15/00* (2016.05); *F16D 7/025* (2013.01); *F05B 2260/4023* (2013.01)

(58) Field of Classification Search
CPC .......... F16D 43/215; F16D 7/025; F03D 9/25; F03D 15/00; F05B 2260/4023
See application file for complete search history.

(56) References Cited

FOREIGN PATENT DOCUMENTS

| EP | 1445 484 A1 | 8/2004 |
|---|---|---|
| EP | 2431714 A1 | 3/2012 |
| FR | 902901 A | 9/1945 |

OTHER PUBLICATIONS

European Search Report dated May 4, 2020 for Application No. 19200560.1.

*Primary Examiner* — Viet P Nguyen

(74) *Attorney, Agent, or Firm* — Schmeiser, Olsen & Watts LLP

(57) ABSTRACT

Provided is a drive train of a wind turbine. The drive train includes a torque limiter assembly including a torque limiter. The torque limiter includes: a first clamping disk, a friction disk, a second clamping disk, and a preloading means. The clamping disks and the friction disk are configured such that the clamping disks frictionally transmit a torque to the friction disk. The torque limiter assembly further includes a torque shaft and a hub shaft. The torque shaft is connected to a rotor of the wind turbine, and the hub shaft is connected to a generator rotor of a generator. The friction disk is bolted to the hub shaft via interface bolts from a downwind side, such that the torque limiter is detachable from the hub shaft as a whole. Further provided is a wind turbine.

15 Claims, 6 Drawing Sheets

DRIVE TRAIN OF A WIND TURBINE COMPRISING A TORQUE LIMITER, WIND TURBINE

CROSS-REFERENCE TO RELATED APPLICATIONS

This application claims priority to European Application No. 19200560.1, having a filing date of Sep. 30, 2019, the entire contents of which are hereby incorporated by reference.

FIELD OF TECHNOLOGY

The following relates to the drive train of wind turbines and wind turbines.

BACKGROUND

Wind is one of the most important renewable energy technologies. Wind turbines (also referred to as a wind driven power plants, wind turbine generators, or wind energy converters) are more and more arranged in large-scale offshore wind parks. There are many technical challenges relating to these offshore wind parks, as for example the assembly of parts and the transport, the erection of the wind turbine in the sea and the maintenance of the wind turbines.

EP 1 445 484 A1 discloses an overload clutch for working machines having a drive disk connected to a drive shaft of the working machine and frictionally clamped between two friction disks which are connected to a drive shaft of the drive machine. For the drive shaft of the working machine only one radial bearing is provided for centering the friction disks relative to the drive disk.

SUMMARY

An aspect relates to an improved drive train of a wind turbine comprising an easily exchangeable/serviceable torque limiter for limiting the maximum torque in the drive train. It is also an object to provide an improved wind turbine.

According to an aspect, the drive train comprises a torque limiter assembly. The torque limiter assembly comprises a torque limiter.

The torque limiter comprises a first clamping disk, and a friction disk. The torque limiter can further comprise a second clamping disk, or even more than two clamping disks. Generally, the number of clamping disks can be equal to the number of frictions disks. Alternatively, the number of clamping disks can be one greater than the number of friction disks. The torque limiter further comprises a preloading means. For better understanding, the following is described of a configuration having two clamping disks and a single friction disk.

The clamping disks and the friction disk are configured such that the friction disk is frictionally clamped between the clamping disks. The clamping force to frictionally clamp the friction disk between the clamping disks is pre-determined by the preloading means. Therefore, the clamping disks frictionally transmit a torque up to a predefined maximum torque to the friction disk. An over-torque above the predefined maximum torque, however, causes the friction disk to slip relative to the clamping disks.

According to another aspect, the torque limiter assembly further comprises a torque shaft and a hub shaft. The torque shaft can be connected to a rotor of the wind turbine. The hub shaft can be connected to a generator rotor of a generator of the wind turbine.

The friction disk can be bolted to the hub shaft via interface bolts from a downwind side. Therefore, the torque limiter can be detached from the hub shaft as a whole.

According to an advantageous aspect, the hub shaft can be a hollow shaft. The hub shaft and the torque shaft can be coaxially aligned along the longitudinal direction X. The torque shaft can extend through the hub shaft. The hub shaft and the torque shaft both can extend from the torque limiter in an upwind direction.

According to another advantageous aspect, the torque shaft can be connected to the first clamping disk. The torque shaft can comprise a detachable articulated joint at an upwind end. Accordingly, the torque shaft assembly can be extracted from the hub shaft assembly by disengaging the bolts attaching the friction disk to the generator hub assembly, such that the torque shaft can be detached from the first clamping disk by disengaging/unfastening bolts and/or bolts from the downwind side.

According to another advantageous aspect, the torque shaft can be connected to the first clamping disk via an intermediate disk comprised by the torque limiter. According to another advantageous aspect, the intermediate disk can comprise through holes providing access to the interface bolts.

Differently stated, the intermediate disk can be bolted to the torque shaft and to the first clamping disk. The intermediate disk can be bolted to the torque shaft via intermediate disk interface bolts from the downwind side, such that the torque limiter is detachable from a remaining portion of the torque limiter assembly by unscrewing interface bolts and the intermediate disk interface bolts.

According to another advantageous aspect, the intermediate disk can be configured as a brake disk for a holding brake. Brake calipers can be attached to the generator housing and can engage the brake disk.

According to another advantageous aspect, the intermediate disk can comprise through holes configured to receive portions of the preloading means extending through the through holes. Advantageously, the through holes have a diameter that is larger than a maximum diameter of the portions of the preloading means extending through the through holes. This aspect provides the intermediate disk being mountable to and removable from the torque limiter assembly without affecting the predetermined clamping force of the preloading means.

According to another advantageous aspect, a first circumferential seal can be arranged between the first clamping disk and the friction disk, and a second circumferential seal can be arranged between the second clamping disk and the friction disk, such that the first circumferential seal and the second circumferential seal can provide a sealed space for the friction surfaces of the clamping disks and the friction disk.

According to an advantageous aspect, the drive train can comprise at least one and particularly two sliding rings. The sliding rings can be configured to align the friction disk and the clamping disks with respect to each other. This aspect allows the torque shaft being supported by the generator bearing.

According to another advantageous aspect, the friction disk and the hub shaft can be configured to be electrically insulated from a remaining portion of the torque limiter assembly. The remaining portion can at least comprise the clamping disks and the torque shaft.

The sliding rings and the friction surfaces can comprise one or more electrically insulating materials. The sliding rings and the frictions surfaces having different material may optimize the friction according to the intended purpose.

Air gaps between the friction disk and the clamping disks outside the insulating friction surfaces, and between the friction disk and/or the hub shaft and the torque shaft can have a sufficient height to provide robust electrical insulation.

The torque shaft can comprise a seal ring in a downwind flange portion of the torque shaft. The seal ring can be configured and arranged to provide a sealing between the torque shaft and the friction disk, or to provide a sealing between the torque shaft and the hub shaft.

According to an advantageous aspect, the entire torque limiter assembly 26 can be (solely) supported by a generator bearing assembly having a second hub shaft. The hub shaft can be is rigidly connected, i.e. screwed, to the second hub shaft.

The torque limiter assembly and the drive train can be configured such that the torque limiter can be mounted to and separated from the drive train without the need to remove the generator first.

The aforementioned aspects vastly reduce the amount of necessary work to exchange or readjust the torque limiter. The insulated configuration prevents premature wear and damage to the bearings. The torque limiter protects the generator and other components of the drive train of overload.

According to an advantageous aspect, the torque limiter assembly and particularly the intermediate disk (the holding brake disk) can comprise a drive interface configured to temporarily attach a driven portion of a single blade installation tool. The drive interface, for example, can comprise a plurality of threaded holes to attach a corresponding flange of the single blade installation tool.

The drive train and particularly a generator housing of the generator can comprise a mounting interface that is configured to temporarily mount a stationary portion of the single blade installation tool.

The single blade installation tool can comprise a (hydraulic) motor and a gear drive. The single blade installation tool can rotate the rotor 6 of the wind turbine, i.e. for installing blades to the rotor hub or maintenance work on the drive train, by rotating the torque limiter of the drive train.

BRIEF DESCRIPTION

Some of the embodiments will be described in detail, with references to the following Figures, wherein like designations denote like members, wherein.

DETAILED DESCRIPTION

Figure 1:
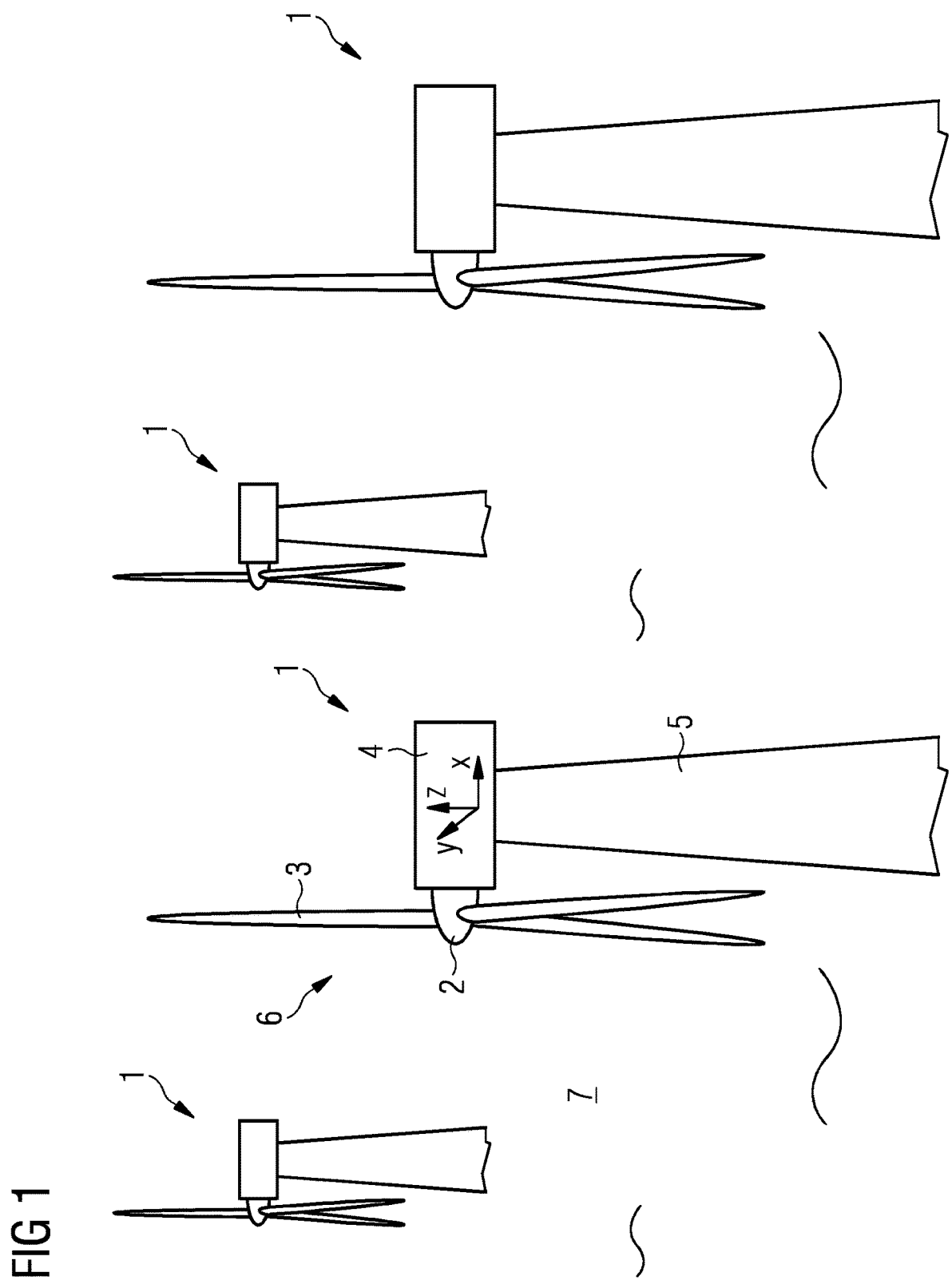
FIG. 1 is a simplified perspective view of a wind park comprising a plurality of wind turbines.

FIG. 1 shows a simplified perspective view of a wind park comprising a plurality of wind turbines 1. Each of the wind turbines 1 comprises a nacelle 4 and a rotor 6. The rotor 6 comprises a central rotatable rotor hub 2. Rotor blades 3 are attached to the rotor hub 2.

The nacelle 4 extends in a vertical direction Z, which is substantially parallel to the axial extension a tower 5 on which the nacelle 4 is mounted. The nacelle also extends in a horizontal plane defined by a longitudinal direction X, which is substantially parallel to a drive train to be located in the nacelle 4, and a transversal direction Y. The longitudinal direction X and the transversal direction Y are both perpendicular to the vertical direction Z and to each other. The longitudinal direction X substantially corresponds to the axis of rotation of the rotor 6 and the drive train.

The wind park can be an offshore wind park. Accordingly, the wind turbines 1 may be installed on the open sea 7.

Figure 2:
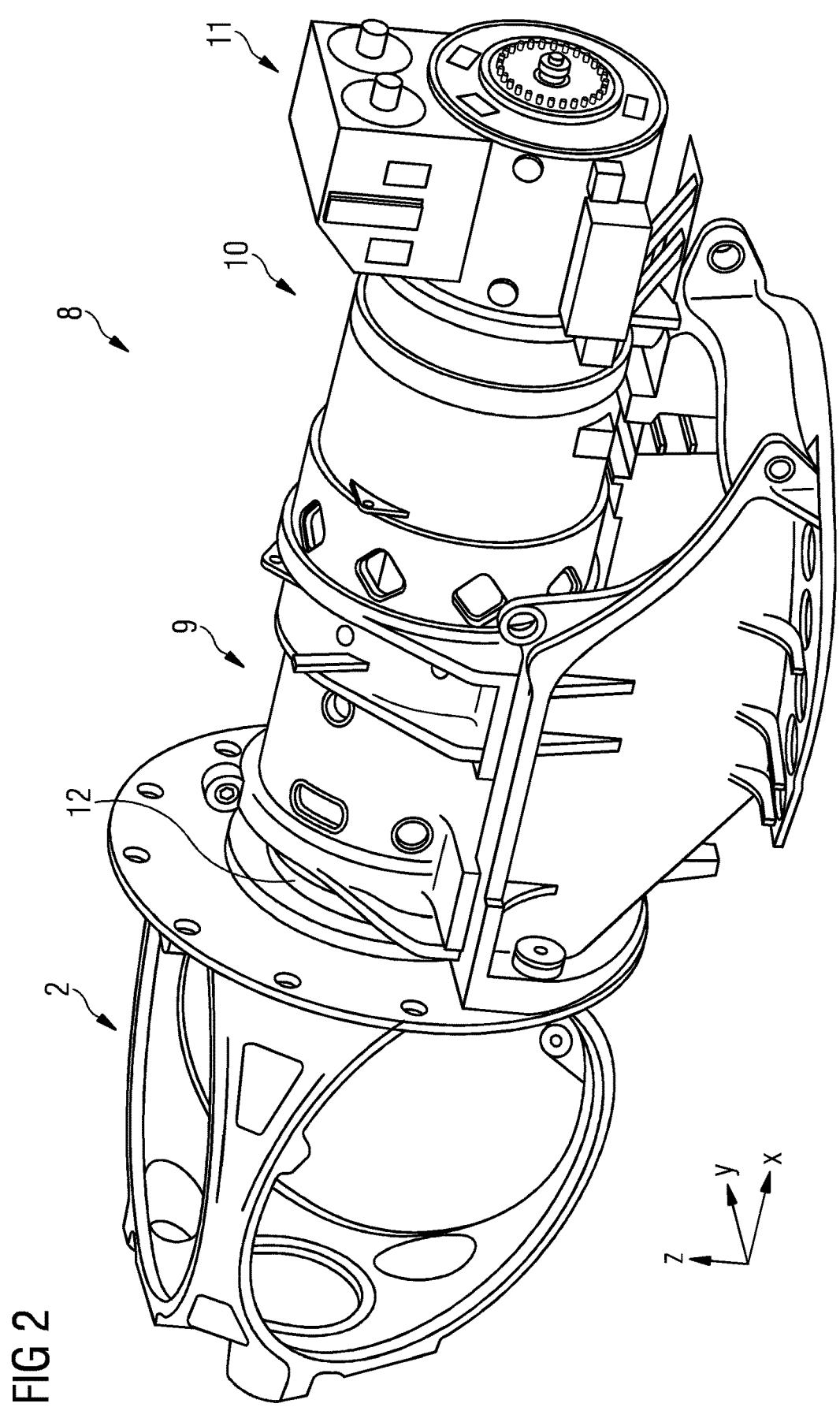
FIG. 2 is a simplified perspective view of a drive train of a wind turbine.

FIG. 2 shows a simplified perspective view of a drive train 8 of a wind turbine 1.

To describe the relative arrangement/position of components in the longitudinal direction X, the terms "upwind" (windward) and "downwind" (leeward), as well as "front" and "rear" are used. These references, however, relate to the wind direction under normal operations, i.e. when the rotor 6 of the wind turbine is directed (turned) towards the wind. Generally speaking, the rotor 6 is in front (upwind) of the nacelle 4. Comparing positions of two components of the drive train 8 in the longitudinal direction X, the component closer to the rotor hub 2 is referred to as upwind/front component, the component further away from the rotor hub 2 (along the longitudinal direction X) is referred to as downwind/rear component.

In Downwind direction, the drive train 8 comprises a main shaft assembly 9, a gearbox 10, and a generator 11.

The main shaft assembly 9 comprises a main shaft housing 13, a main bearing, and a main shaft 12. The main bearing is mounted in the main shaft housing 13. The main shaft 12 is supported by the main bearing. The rotor hub 2 is attached to and supported by the main shaft 12. The main shaft 12 rotates along with the rotor 6.

The gearbox 10 is attached to the main shaft assembly 9. A gearbox input shaft is attached to a downwind portion of the main shaft 12. The gearbox input shaft rotates along with the main shaft 12.

The gearbox 10 comprises a multi-stage planetary gear. More precisely, the gearbox 10 comprises a two stage planetary gear. The planetary gearbox is configured to convert a slow rotary motion of the gearbox input shaft into a more rapid rotary motion of a gearbox output shaft.

Figure 3:
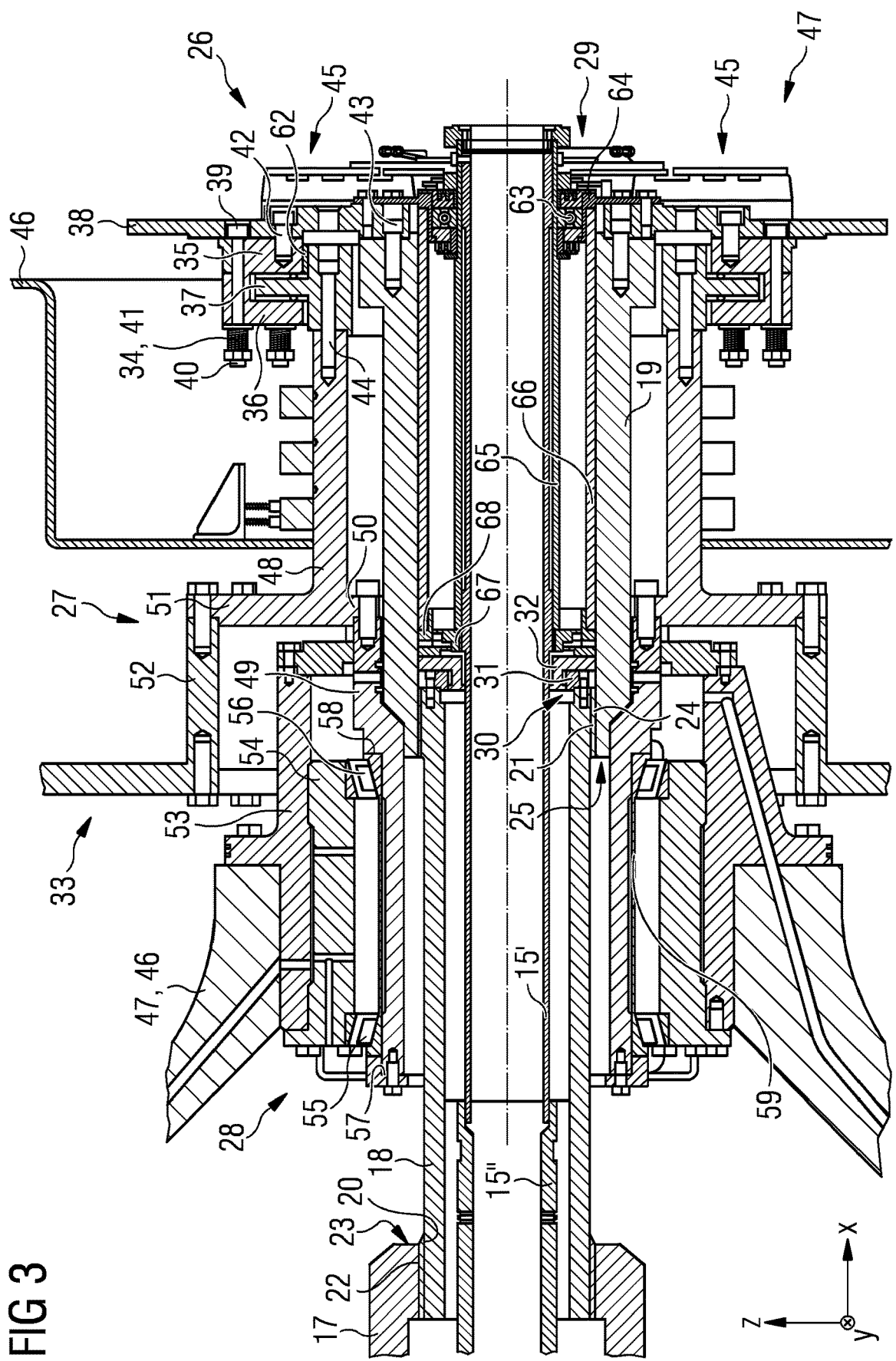
FIG. 3 is a cross-sectional view of a downwind portion of the drive train.

FIG. 3 shows a cross-sectional view of a downwind portion of the drive train 8. The downwind portion of the drive train 8 comprises a coupling shaft 18, a torque limiter assembly 26, a generator hub assembly 27, a generator bearing assembly 28, an energy tube 15, and an energy tube bearing assembly 29.

Coupling Shaft

The coupling shaft 18 is a hollow shaft. The coupling shaft 18 comprises a first (upwind) coupling part 20, and a second (downwind) coupling part 21.

The coupling shaft 18 is floatingly supported by a gearbox output shaft 17 and a torque shaft 19.

The gearbox output shaft 17 comprises a gearbox output coupling part 22. The first coupling part 20 of the coupling shaft 18 and the gearbox output coupling part 22 cooperatively form a first articulated joint 23.

The torque shaft 19 comprises a torque shaft input coupling part 24. The second coupling part 21 of the coupling shaft 18 and the torque shaft input coupling part 24 cooperatively form a second articulated joint 25.

The coupling shaft 18 is float-mounted between the gearbox output coupling part 22 and the torque shaft input coupling part 24.

By the first and second articulated joints 23, 25, the coupling shaft 18 rotates along the gearbox output shaft 17, and the torque shaft 19 rotates along the coupling shaft 17.

The first and the second articulated joints 23, 25 compensate concentricity tolerances and misalignments of the gearbox output shaft 17 and the torque shaft 19.

The articulated joints 23, 25 can be based on various functioning principles. In the depicted embodiment, the articulated joints 23, 25 each comprise a spline coupling. Splines are ridges or teeth on a drive shaft (male splines) that mesh with grooves in a mating piece (female splines) and transfer torque to it, maintaining the angular correspondence between the drive shaft and the mating piece. In this embodiment, the coupling shaft 18 comprises male splines on the first and second coupling parts 20, 21. The male splines of the first and second coupling parts 20, 21 match female splines of the gearbox output coupling part 22 and the torque shaft input coupling part 24, respectively.

The spline couplings of the first and second articulated joints 23, 25 are crowned spline couplings. The sides of the equally spaced grooves are involutes. The male teeth are modified to allow for misalignment (angular movement), by having a crowned (convex) shape.

As the coupling shaft 18 is a floating shaft, the coupling shaft has a degree of freedom in axial/longitudinal direction X. The coupling shaft 18 is only supported by the first and the second articulated joints 23, 25. The coupling shaft 18 is not supported by an additional bearing.

Constraining Means

The movement of the floating coupling shaft 18 in longitudinal direction X is constrained to a predetermined range of motion by a constraining means 30. Differently stated, the coupling shaft 18 is axially supported by the torque shaft 19.

The constraining means 30 can be based on various functioning principles.

In the depicted embodiment, the constraining means 30 comprises a bayonet coupling. More specifically, the constraining means 30 comprises a male bayonet and a female bayonet, wherein one out of the male bayonet and the female bayonet is rigidly attached to or forms part of the coupling shaft 18, and respective other out of the male bayonet and the female bayonet is rigidly attached to or forms part of the torque shaft 19. In this case, a female bayonet 31 of the bayonet coupling is rigidly attached (screwed) to the coupling shaft 18; a male bayonet 32 is rigidly attached (screwed) to the torque shaft 19.

An alternative functioning principle of the constraining means 30, for example, can be based on a first abutment surface (stopper) in/at the interface of the gearbox output shaft 17 and the coupling shaft 18, and a second abutment surface (stopper) in/at the interface of the coupling shaft 18 and the torque shaft 19.

Torque Shaft and Torque Limiter

The generator rotor 33 of the generator 11 is directly or indirectly attached to the torque shaft 19. In the present case, the torque shaft 19 is attached to a torque limiter 26, and the torque limiter 26 is attached to the generator hub assembly 27. The generator hub assembly supports the generator rotor 33.

Under normal operating conditions, the generator rotor 33 rotates along the torque shaft 19.

Under extraordinary loads, such as the extremely high torque peaks in the case of a short circuit of the generator 11, however, the torque limiter 26 detaches the generator rotor 33 from the torque shaft 19. In other words, the torque limiter disconnects the mechanical (and rotationally stiff) connection between the torque shaft 19 and the generator rotor 33 in case of an overload.

The torque limiter (assembly) 26 is a (mechanical) overload clutch. The torque limiter comprises at least a first and a second friction surface rubbing against each other. An adjustable preloading means 34 applies an adjustable force clamping together the first and the second friction surfaces to provide an adjustable and predetermined release torque. If the load torque becomes greater that the release torque, the torque limiter 26 at least disengages the connection between the gearbox 10 and the generator 11. In other words, the torque limiter 26 limits the torque in all parts of the drive train 8 to predetermined maximum torques. For example, if the gearbox is a gearbox having a transmission ratio $R=n_{IN}/n_{OUT}$, wherein the transmission ratio R is smaller than 1 (speed increasing ratio), the torque in the drive train 8 upwind of the gearbox may be at maximum (considering an idealized model that is neglecting additional losses) $M_{UPWIND}=1/R*M_{RELEASE}$.

In this embodiment, the torque limiter 26 comprises a first and a second clamping disk 35, 36 and a friction disk 37 that is mutually sandwiched by the first clamping disk 35 and second clamping disk 36. The preloading means 34 comprises a plurality of bolts 39 extending through the first and second clamping disks 25, 26, corresponding nuts 40, and corresponding spring elements 41. The preloading means 34 can further comprise one or more ring washers per bolt 39. In particular, the preloading means 34 comprise bolts 39 each extending through the clamping disks 35, 36 and (in this order) further extending through an optional first washer, a spring 41, an optional second washer and a nut 40. The preload/clamping force is adjusted by tightening or loosening the respective bolt-nut connections of the preloading means 34.

The first clamping disk 35 comprises a first friction surface. The friction disk comprises a second friction surface and a third friction surface. The second clamping disk 36 comprises a fourth friction surface. The frictional force between the first an the second friction surfaces and the frictional force between the fourth and the third friction surfaces transmit the rated maximum torque load (or less) from the torque shaft 19 to the generator hub assembly 27. The amount of preloading force determines the frictional force.

The first clamping disk 35 is (directly or indirectly, and) rigidly attached to or forms part of the torque shaft 19.

The friction disk 37 is (directly or indirectly, and) rigidly attached to or forms part of the generator hub assembly 27.

One or more sliding rings 62 align and center the clamping disks 35, 36 with respect to the friction disk 37 and/or the first hub shaft 48.

The torque limiter 26 is configured being a module that can be assembled and pre-adjusted at the factory. The torque limiter 26 can be mounted to the drive train 8 as a whole. In other words, the torque limiter 26 (and more precisely the first clamping disk) is bolted (screwed, flanged) to the torque shaft 19 via a brake disk 38 by bolts 43, 42. The torque limiter 26 (and more precisely the friction disk 37) is bolted to the generator hub assembly 27 by bolts 44, respectively. Stated differently, the bolts 43 rigidly attach the brake disk 38 to the torque shaft 19. The bolts 42 rigidly attach the first clamping disk 35 to the brake disk 38. The bolts 44 attach the friction disk 37 to the generator hub assembly 27.

Holding Brake

In this embodiment, the drive train 8 further comprises a holding brake 47. The holding brake is configured to hold the rotating components of the drive train 8 in a fixed, non-rotating position. The holding brake comprises a brake disk 38 that is rigidly attached to the generator hub assembly 27 and/or the torque shaft 19. The holding brake further comprises one or more brake caliper(s) 45, each having one or more brake pads. The brake caliper(s) is/are rigidly attached (screwed, bolted) to the generator housing 46.

The brake disk 38 of the holding brake 47 provides a dual use, i.e. being a component of the holding brake 47 holding the rotational parts of the drive train 8 in a fixed position, and providing support for the first clamping disk 35 of the torque limiter 26.

Differently stated, the torque limiter 26 and the holding brake 47 can be configured as a combined module that can be mounted to the drive train 8 without requiring any kind of dismantlement (i.e. detaching the generator 11 from the gearbox 10, or removing parts of the generator 11 to access the torque limiter 26).

Generator Hub Assembly

The generator hub assembly 27 comprises a first hub shaft 48. The first hub shaft 48 is a hollow shaft. The torque limiter 26 can be rigidly attached (screwed/bolted) to the downwind side of the first hub shaft 48.

The first hub shaft 48 further comprises a first upwind flange 50 that extends in an inward direction and a second upwind flange 51 that extends in an outward direction.

The generator rotor 33 is rigidly attached (screwed) to the second upwind flange 51 via a spacer ring 52.

The first hub shaft 48 is rigidly connected (screwed) to and supported by a second hub shaft 49 via the first upwind flange 50.

The second hub shaft 49 is comprised and supported by a generator bearing assembly 28.

Generator Bearing Assembly

The generator bearing assembly 28 comprises an outer bearing bushing 53 that is rigidly attached (screwed) to the load bearing wall 47 of the generator housing 46 via a flange from the downwind side. An inner bearing bushing 54 is inserted into and supported by the outer bearing bushing 53. The inner bearing bushing 54 comprises an upwind flange, a first annular supporting surface adjacent to the upwind flange, and a second annular supporting surface at its distal (downwind) end. The first and second annular supporting surfaces of the inner bearing bushing 54 abut against the inner surface of the outer bearing bushing 53. The inner bearing bushing 54 is rigidly attached (screwed) to the outer bearing bushing 53 at the flange.

The inner bearing bushing 54 comprises an upwind inner recess and a downwind inner recess at the ends of the inner bearing bushing 54 to accommodate an upwind and a downwind generator rolling bearing supporting the second hub shaft 49, respectively. The upwind and downwind rolling bearings are tapered roller bearings arranged in an 'O'-configuration.

The second hub shaft 49 comprises a circumferential abutment edge on the downwind side. The inner bearing rings of the upwind and downwind generator rolling bearings 55, 56 are braced and tensioned between the abutments edge 58 and a clamping ring 57. A spacer tube 59 spaces the inner bearing rings of the upwind and downwind generator bearings 55, 56 apart. The clamping ring 57 is bolted to the second hub shaft 49. The bearing preload is determined by tensioning the respective bolts/screws connecting the clamping ring 57 to the upwind face of the second hub shaft 49.

The generator bearing assembly 28 further comprises an annular downwind sealing lid that comprises a rotary shaft seal 61 in a recess, which rotary shaft seal 61 provides a sealing between the stationary outer bearing bushing 53 of the generator bearing shaft assembly 28 and the rotating second hub shaft 49.

Energy Tube and Energy Tube Bearing Assembly

A central energy tube 15 axially extends through the drive train 8 in longitudinal direction X. The energy tube 15 rotates along the gearbox input shaft 16 and the main shaft 12. The energy tube 15 accommodates hydraulic and/or electrical lines to supply the rotor hub 2 (and in particular devices in the rotor 2, such as pitch drives, actuators and/or sensors) with energy and/or to transmit signals.

The energy tube 15 is rotatably supported by an energy tube bearing 63 on the downwind side of the drive train 8. The energy tube bearing 63 is comprised by an energy tube bearing bushing 64. The energy tube bearing bushing 64 is rigidly attached (screwed) to the torque limiter 26, in particular to the brake disk 38.

The energy tube bearing assembly 28 (which may also be referred to as energy tube bearing cartridge 28) comprises a cartridge core shaft 65 and a cartridge jacket 66. The cartridge core shaft 66 is a hollow shaft. The energy tube bearing is sandwiched between the cartridge core shaft 65 and an energy tube bearing bushing 64. The energy tube bearing bushing 64 is at least partially inserted into and abutted against the cartridge jacket 66.

An inner labyrinth seal ring 67 is push-fitted onto an upwind end of the cartridge core shaft 65. A corresponding outer labyrinth seal ring 68 is partly inserted into and abutting against an upwind end face of the cartridge jacket 66. The inner labyrinth seal ring 67 and the outer labyrinth seal ring 68 are arranged such that they cooperatively form a labyrinth sealing adjacent to the interface (the spline coupling) of the coupling shaft 18 and the torque shaft 19. The labyrinth sealing is arranged on the downwind side of the interface.

Figure 4:
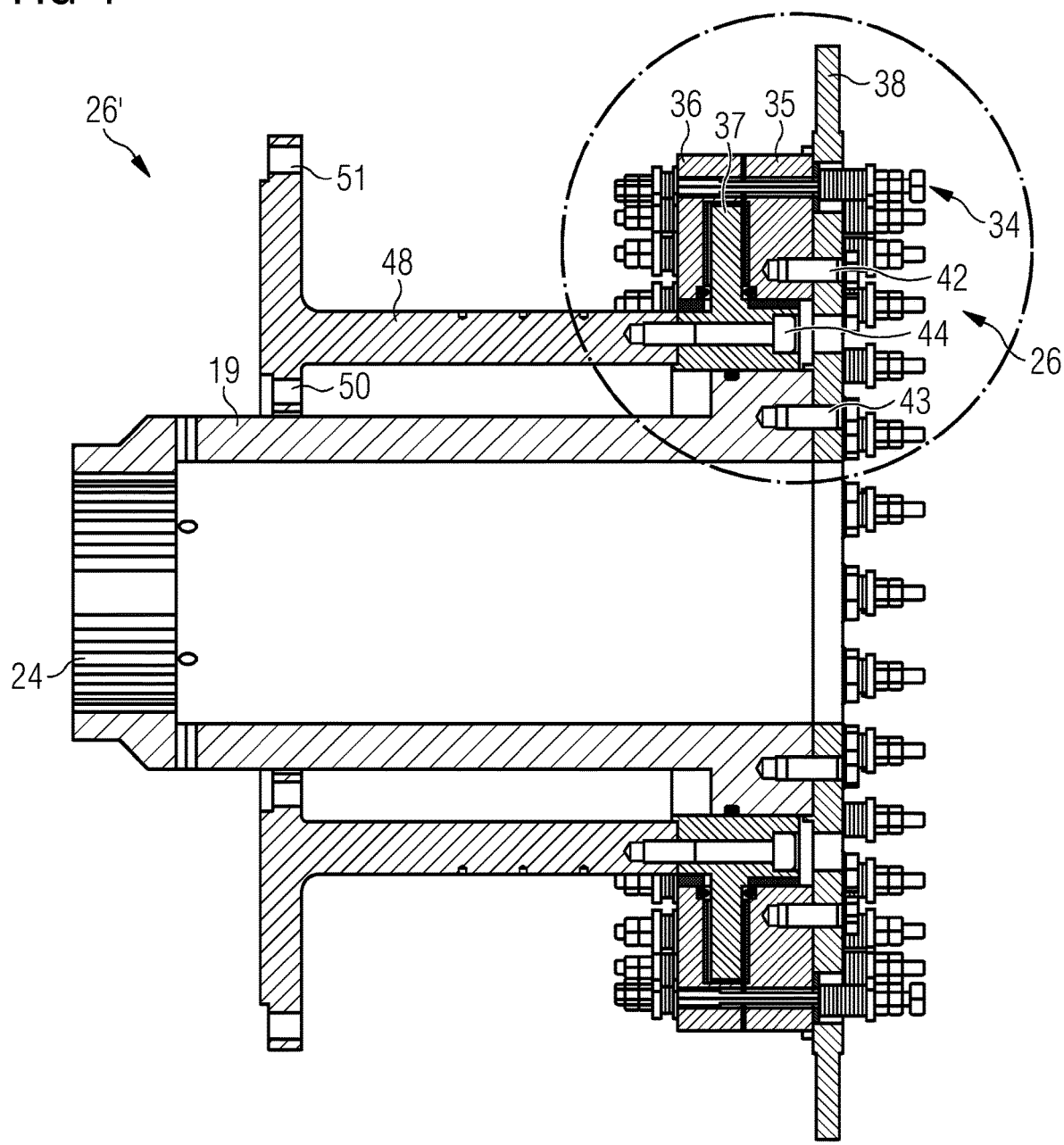
FIG. 4 is a cross-sectional view of a torque limiter assembly.
Figure 5:
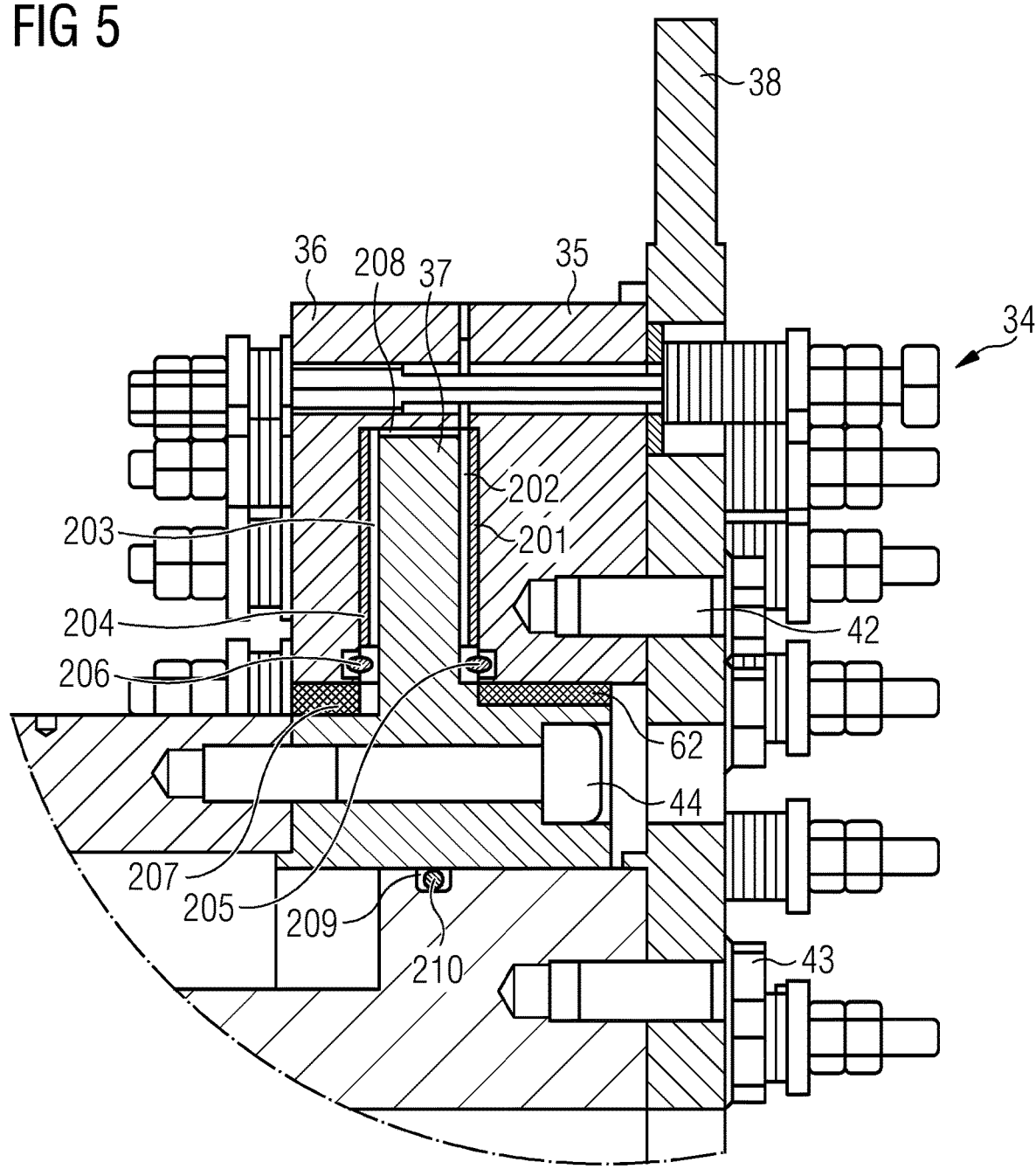
FIG. 5 is an enlarged and detailed view of a portion of FIG. 4.

FIG. 4 shows a cross-sectional view of a torque limiter assembly; FIG. 5 shows an enlarged and detailed view of a portion of FIG. 4. The torque limiter assembly 26' is comprised by a drive train 8 of a wind turbine 1. The torque limiter assembly 26' comprises a torque limiter 26.

The torque limiter 26 comprises a first clamping disk 35, a friction disk 37, a second clamping disk 36, and a preloading means 34.

The clamping disks 35, 36 and the friction disk 37 are configured such that the friction disk 37 is frictionally clamped between the clamping disks 35, 36. The clamping force to frictionally clamp the friction disk 37 between the clamping disks 35, 36 is pre-determined by the preloading means 34 such that the clamping disks 35, 36 frictionally transmit a torque up to a predefined maximum torque to the friction disk 37, and an over-torque above the predefined maximum torque causes the friction disk 37 to slip relative to the clamping disks 35, 36.

The torque limiter assembly 26' further comprises a torque shaft 19 and a hub shaft 48. The torque shaft is connected to a rotor 6 of the wind turbine 1. The hub shaft 48 is connected to a generator rotor 33 of a generator 11 of the wind turbine 1.

The friction disk 37 is bolted to the hub shaft 48 via interface bolts 44 from a downwind side. Therefore, the torque limiter 26 is detachable from the hub shaft 48 as a whole.

The hub shaft 48 is a hollow shaft. The hub shaft 48 and the torque shaft 19 are coaxially aligned along the longitudinal direction X. The hub shaft 48 and the torque shaft 19 extend from the torque limiter 26 in an upwind direction.

The torque shaft 19 is connected to the first clamping disk 35. The torque shaft 19 comprises a detachable articulated joint 24 at an upwind end, such that the torque shaft assembly 26' can be extracted from the hub shaft assembly by disengaging the bolts 44 attaching the friction disk 37 to the generator hub assembly. Furthermore, the torque shaft 19 is detachable from the first clamping disk 35 from the downwind side by disengaging/unfastening bolts 43 and/or bolts 44.

The torque shaft 19 is connected to the first clamping disk 35 via an intermediate disk 38 comprised by the torque limiter 26. The intermediate disk 38 comprises through holes providing access to the interface bolts 44.

Differently stated, the intermediate disk 38 is bolted to the torque shaft 19 and to the first clamping disk 35. The intermediate disk 38 is bolted to the torque shaft 19 via intermediate disk interface bolts 43 from the downwind side, such that the torque limiter 19 is detachable from a remaining portion of the torque limiter assembly 26' by unscrewing the interface bolts 44 and the intermediate disk interface bolts 43.

The intermediate disk 38 is configured as a brake disk for a holding brake. Brake calipers 45 are attached to the generator housing and can engage the brake disk 38.

The intermediate disk 38 comprises through holes configured to receive portions of the preloading means 34 extending through the through holes. The through holes have a diameter that is larger than a maximum diameter of the portions of the preloading means extending through the through holes. Therefore, the intermediate disk 38 is mountable to and removable from the torque limiter assembly 26' without affecting the predetermined clamping force of the preloading means 34.

A first circumferential seal 205 is arranged between the first clamping disk 35 and the friction disk 37, and a second circumferential seal 206 is arranged between the second clamping disk 36 and the friction disk 37, such that the first circumferential seal 205 and the second circumferential seal 206 provide a sealed space for friction surfaces of the clamping disks 35, 36 and the friction disk 37.

The drive train comprises at least one and particularly two sliding rings 62, 207. The sliding rings 62, 207 are configured to align the friction disk 37 and the clamping disks 35, 36 with respect to each other.

The friction disk 37 and the hub shaft 48 are configured to be electrically insulated from a remaining portion of the torque limiter assembly 26'. The remaining portion at least comprises the clamping disks 35, 36 and the torque shaft 19.

The sliding rings 62, 207 and friction surfaces 201-204 comprise one or more electrically insulating materials.

Air gaps 208, 209 between the friction disk 37 and the clamping disks 35, 36 outside the insulating friction surfaces 201-204, and between the friction disk 37 and/or the hub shaft 48 and the torque shaft 19 have a sufficient height to provide electrical insulation.

The torque shaft comprises a seal ring 210 in a downwind flange portion of the torque shaft. The seal ring is configured and arranged to provide a sealing between the torque shaft 19 and the friction disk 37, or to provide a sealing between the torque shaft 19 and the hub shaft 48.

The entire torque limiter assembly 26' is (solely) supported by a generator bearing assembly 28 having a second hub shaft 49. The hub shaft (48) is rigidly connected, i.e. screwed, to the second hub shaft 49.

The torque limiter assembly 26' and the drive train 8 are configured such that the torque limiter 26 can be mounted to and separated from the drive train 8 without the need to remove the generator 11 first.

Figure 6:
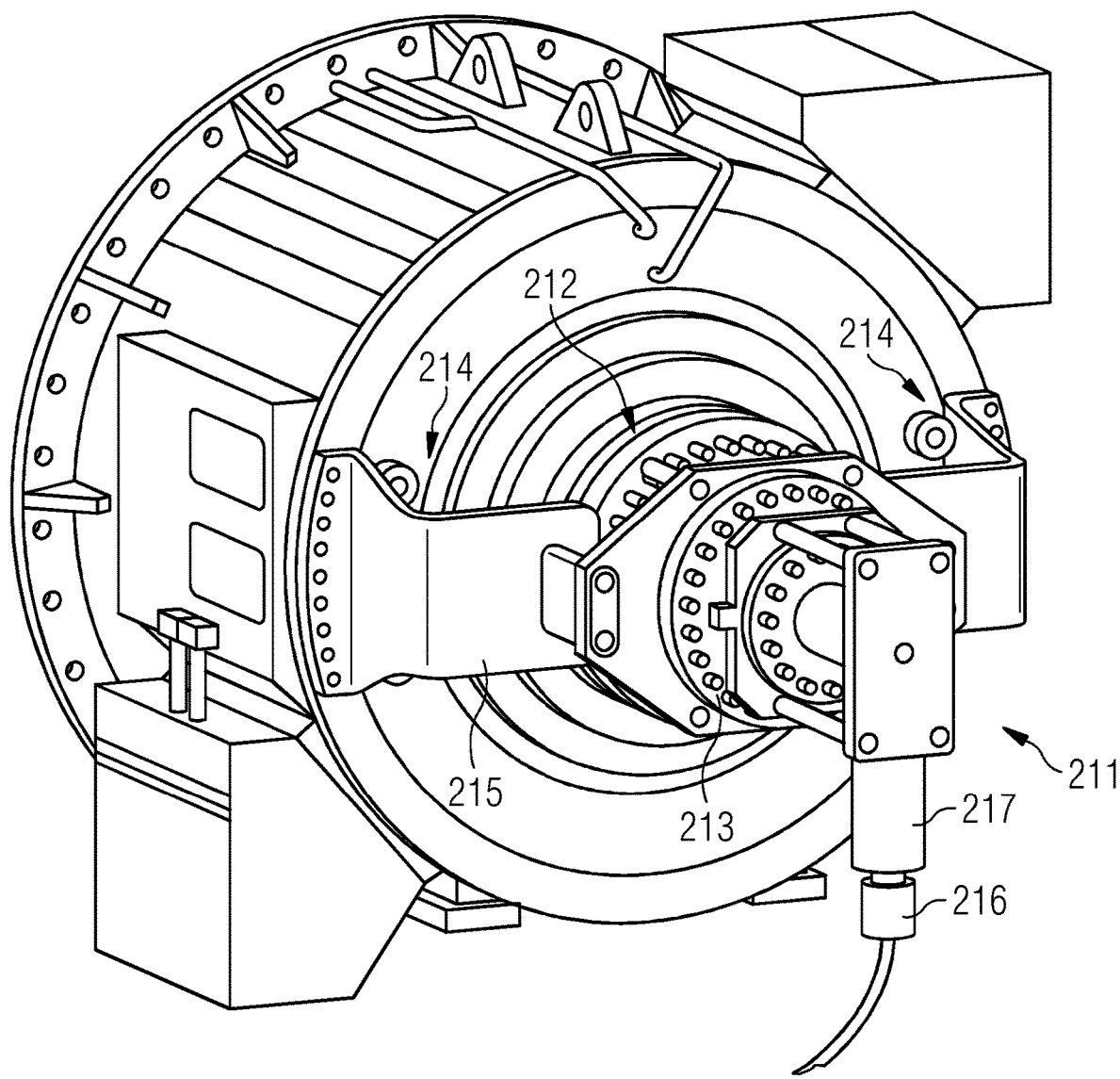
FIG. 6 is a simplified view of a generator having attached to it a single blade installation tool.

FIG. 6 shows a simplified view of a generator having attached to it a single blade installation tool. The outer generator housing is not shown. The generator 11 comprises a generator stator. The generator stator may be considered to form a part of the generator housing.

The torque limiter assembly 26' and particularly the intermediate disk 38 comprises a drive interface 212 configured to temporarily attach a driven portion 213 of a single blade installation tool 211. The drive interface 212, for example, comprises a plurality of threaded holes to attach a corresponding flange of the single blade installation tool 211.

The drive train 8 and particularly a generator housing of the generator 11 comprises a mounting interface 214 that is configured to temporarily mount a stationary portion 215 of the single blade installation tool 211.

The single blade installation tool comprises 211 a (hydraulic) motor 216 and a gear drive 217. The single blade installation tool 211 can rotate the rotor 6 of the wind turbine 1 by rotating the torque limiter 26 of the drive train 8.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A drive train of a wind turbine comprising a torque limiter assembly, the torque limiter assembly comprising:
    a torque shaft connected to a rotor of the wind turbine;
    a hub shaft connected to a generator rotor of a generator of the wind turbine;
    a torque limiter comprising a first clamping disk, a friction disk, a second clamping disk, and a preloading means,
    wherein the first clamping disk, the second clamping disk, and the friction disk are configured such that the friction disk is frictionally clamped between the first clamping disk and the second clamping disk,
    wherein a clamping force to frictionally clamp the friction disk between the first clamping disk and the second clamping disk is pre-determined by the preloading means such that the first clamping disk and the second clamping disk frictionally transmit a torque up to a predefined maximum torque to the friction disk, and an over-torque above the predefined maximum torque causes the friction disk to slip relative to the first clamping disk and the second clamping disk,
    wherein the friction disk is bolted to the hub shaft via interface bolts from a downwind side, such that the torque limiter is detachable from the hub shaft as a whole;
    wherein the torque shaft comprises a seal ring in a downwind flange portion of the torque shaft, wherein the seal ring is configured and arranged to provide a sealing between the torque shaft and the friction disk, or to provide a sealing between the torque shaft and the hub shaft.

2. The drive train of claim 1, wherein the hub shaft is a hollow shaft, and wherein the hub shaft and the torque shaft are coaxially aligned along a longitudinal direction X, and extending from the torque limiter in an upwind direction.

3. The drive train of claim 1, wherein the torque shaft is connected to the first clamping disk; and
wherein the torque shaft comprises a detachable articulated joint, or
wherein the torque shaft is detachable from the first clamping disk from the downwind side.

4. The drive train of claim 1, wherein the torque shaft is connected to the first clamping disk via an intermediate disk comprised by the torque limiter, and wherein the intermediate disk comprises through holes providing access to the interface bolts, wherein the intermediate disk is bolted to the torque shaft and to the first clamping disk.

5. The drive train of claim 4, wherein the intermediate disk is bolted to the torque shaft via intermediate disk interface bolts from the downwind side, such that the torque limiter is detachable from a remaining portion of the torque limiter assembly by unscrewing the interface bolts and the intermediate disk interface bolts.

6. The drive train of claim 4, wherein the intermediate disk is configured as a brake disk for a holding brake.

7. The drive train of claim 6, wherein the intermediate disk comprises through holes configured to receive portions of the preloading means extending through the through holes, the through holes having a diameter that is larger than a maximum diameter of the portions extending through the through holes, such that the intermediate disk is mountable to and removable from the torque limiter assembly without affecting the predetermined clamping force of the preloading means.

8. The drive train of claim 4, wherein the intermediate disk comprises a drive interface configured to temporarily attach a driven portion of a single blade installation tool,
wherein the drive train and a generator housing of the generator comprises a mounting interface configured to temporarily mount a stationary portion of the single blade installation tool,
such that the single blade installation tool comprising a motor and a gear drive can rotate the rotor of the wind turbine by rotating the torque limiter of the drive train.

9. The drive train of claim 1, wherein a first circumferential seal is arranged between the first clamping disk and the friction disk, and a second circumferential seal is arranged between the second clamping disk and the friction disk, such that the first circumferential seal and the second circumferential seal provide a sealed space for friction surfaces of the first clamping disk and the second clamping disk and the friction disk.

10. The drive train of claim 1, further comprising at least one sliding ring configured to align the friction disk and the first clamping disk and the second clamping disk with respect to each other.

11. The drive train of claim 10, wherein the friction disk and the hub shaft are configured to be electrically insulated from a remaining portion of the torque limiter assembly at least comprising the first clamping disk and the second clamping disk and the torque shaft; wherein the sliding ring(s) and friction surfaces comprise an electrically insulating material, and air gaps between the friction disk and the first clamping disk and the second clamping disk, and between the friction disk/the hub shaft and the torque shaft have a sufficient height to provide electrical insulation.

12. The drive train of claim 1, wherein the entire torque limiter assembly is supported by a generator bearing assembly having a second hub shaft, wherein the hub shaft is rigidly connected to the second hub shaft.

13. The drive train of claim 1, wherein the torque limiter assembly and the drive train are configured such that the torque limiter can be mounted to and separated from the drive train without the need to remove the generator first.

14. A wind turbine comprising the drive train according to claim 1.

15. A drive train of a wind turbine comprising a torque limiter assembly, the torque limiter assembly comprising:
a torque shaft connected to a rotor of the wind turbine;
a hub shaft connected to a generator rotor of a generator of the wind turbine;
a torque limiter comprising a first clamping disk, a friction disk, a second clamping disk, and a preloading means,
wherein the first clamping disk, the second clamping disk, and the friction disk are configured such that the friction disk is frictionally clamped between the first clamping disk and the second clamping disk,
wherein a clamping force to frictionally clamp the friction disk between the first clamping disk and the second clamping disk is pre-determined by the preloading means such that the first clamping disk and the second clamping disk frictionally transmit a torque up to a predefined maximum torque to the friction disk, and an over-torque above the predefined maximum torque causes the friction disk to slip relative to the first clamping disk and the second clamping disk,
wherein the friction disk is bolted to the hub shaft via interface bolts from a downwind side, such that the torque limiter is detachable from the hub shaft as a whole;
wherein the torque shaft is connected to the first clamping disk via an intermediate disk comprised by the torque limiter, and wherein the intermediate disk comprises through holes providing access to the interface bolts, wherein the intermediate disk is bolted to the torque shaft and to the first clamping disk.

* * * * *